United States Patent [19]

Shioya et al.

[11] 4,249,490
[45] Feb. 10, 1981

[54] EXHAUST GAS RECIRCULATION FOR ENGINE

[75] Inventors: Toshio Shioya, Urawa; Kiyoshi Ishii, Tachikawa; Hiroyuki Nishimura, Kounosu, all of Japan

[73] Assignee: Honda Giken Kogyo Kabushiki Kaisha, Tokyo, Japan

[21] Appl. No.: 67,469

[22] Filed: Aug. 17, 1979

[30] Foreign Application Priority Data

Sep. 1, 1978 [JP] Japan ............................ 53-106206

[51] Int. Cl.$^3$ .......................................... F02B 47/08
[52] U.S. Cl. ................................................ 123/568
[58] Field of Search ................................ 123/119 A

[56] References Cited

U.S. PATENT DOCUMENTS

| 3,739,797 | 6/1973 | Caldwell | 123/119 A X |
| 3,779,222 | 12/1973 | Lorenz | 123/119 A |
| 3,818,880 | 6/1974 | Dawson et al. | 123/119 A |
| 3,884,200 | 5/1975 | Caldwell | 123/119 A |
| 3,915,136 | 10/1975 | Caldwell | 123/119 A |
| 3,970,061 | 7/1976 | Caldwell | 123/119 A |
| 4,033,308 | 7/1977 | Hayashi | 123/119 A |

FOREIGN PATENT DOCUMENTS 1486093 9/1977 United Kingdom .
1486651 9/1977 United Kingdom .

Primary Examiner—Wendell Burns
Attorney, Agent, or Firm—Lyon & Lyon

[57] ABSTRACT

An exhaust gas recirculation system for an internal combustion engine employs a recirculation control valve in a passageway connecting the engine exhaust passage to the engine intake passage downstream from the throttle valve. An air conduit having an air control valve therein furnishes atmospheric air to the intake passage downstream from the throttle valve. Vacuum responsive actuators are provided for each of the control valves and they are operated by vacuum pressure regulated by a regulating valve, which is itself responsive to differential pressure between vacuum intensity in the intake passage upstream from said throttle valve and modified atmospheric pressure. The modified atmospheric pressure is obtained downstream from a variable throttling valve mounted in a bypass passage connected to the air conduit upstream and downstream with respect to a restriction therein. If atmospheric pressure correction is required, a sealed flexible bellows surrounded by atmospheric pressure may be connected to influence the operation of the variable throttling valve.

7 Claims, 2 Drawing Figures

EXHAUST GAS RECIRCULATION FOR ENGINE

This application is related to co-pending and co-assigned U.S. patent application Ser. No. 9,370 filed Feb. 5, 1979 by Hiroyuki Nishimura, which is incorporated herein by this reference.

This invention relates to exhaust gas recirculation apparatus for internal combustion engines and is particularly directed to an improved control system for such apparatus.

It is desirable to recirculate exhaust gases to the engine intake passage substantially in proportion to intake flow of air to the engine. This is accomplished by the invention stated in the foregoing U.S. patent application. However, it is necessary for driveability and performance of the engine to vary the ratio of exhaust gas recirculation flow to intake flow of air in response to changes of operation of the engine, that is, it is required for obtaining good driveability of the engine to reduce the rate of exhaust gas recirculation during light load operation of the engine and for reducing $No_x$ emission from the engine to increase the rate of exhaust gas recirculation during heavy load operation of the engine. It is also required for obtaining good performance and driveability of the engine to reduce the rate of exhaust gas recirculation during operation of the engine at high altitude. The present invention is directed to a exhaust gas recirculation apparatus for varying the rate of exhaust gas recirculation in response to changes of operation of the engine.

The apparatus includes an exhaust gas recirculation control valve in a passageway connecting the engine exhaust passage to the engine intake passage downstream from the throttle valve. An air conduit having a air control valve therein furnishes atmospheric air to the engine intake passage downstream from the throttle valve. A regulating valve controls the operation of the control valves, and the regulating valve is responsive to differential pressure between the vacuum intensity in the intake passage upstream from the throttle valve, and modified atmospheric pressure obtained downstream from a variable throttling valve in the bypass conduit.

Other and more detailed objects and advantages will appear hereinafter.

Figure 1:
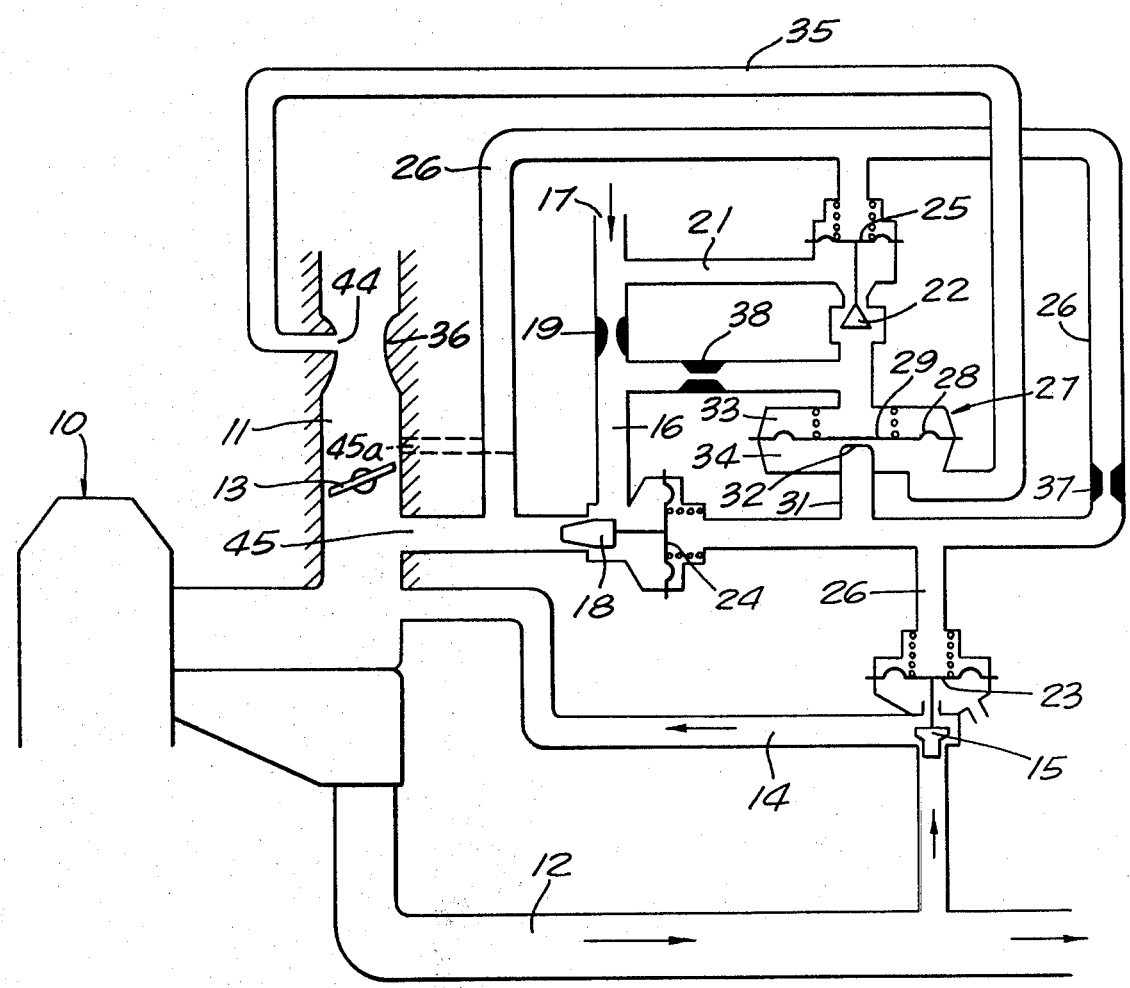
FIG. 1 is a schematic view showing a preferred embodiment of this invention.

Referring to the drawings, the engine 10 has an intake passage 11 for an air-fuel mixture, and a passage 12 for exhaust gases. A throttle valve 13 is provided in the intake passage 11. A passageway 14 connects the exhaust passage 12 to the intake passage 11 at a location downstream from the throttle valve 13, for recirculating exhaust gases into said engine 10. A exhaust gas recirculation control valve 15 is positioned in this passageway 14.

An air conduit 16 is connected to a second vacuum outlet 45 located in the intake passage 11 downstream from the idle position of the throttle valve 13 and has an opening 17 to atmosphere. A air control valve 18 is mounted in said air conduit 16. A orifice 19 is placed in the air conduit 16 at a location between the air control valve 18 and the opening 17 to atmosphere. A bypass conduit 21 is connected to the air conduit 16 both upstream and downstream with respect to said restriction 19, and a variable throttling valve 22 is positioned in said bypass conduit 21. Each of the control valves 15 and 18 and the variable throttling valve 22 is provided with a vacuum responsive actuator 23, 24, and 25, respectively. Each of these actuators is connected to a control pipe system 26, which is in turn connected to the second vacuum outlet 45 or 45a located in the vicinity of the throttle valve 13 above the idle position thereof.

A regulating valve 27 is provided with a movable diaphragm member 28 having a central non-flexible portion 29. An open ended tube 31 forming a part of the control pipe system 26 is closed and opened by contact with the central portion 29 of the diaphragm member 28. A variable opening 32 is thus formed between the open ended tube 31 and the central portion 29 of the diaphragm member 28. The chamber 33 above the diaphragm member 28 of the regulating valve 27 is subjected to pressure in the bypass conduit 21 downstream from the variable throttle valve 22. The chamber 34 below the diaphragm member 28 is connected to a first vacuum outlet 44 in the carburetor venturi section 36 through a tube 35. A restriction 37 is placed in the control pipe system 26 between the variable throttle valve 22 and the exhaust gas circulation control valve 15. Another orifice 38 is placed in the bypass conduit 21 between the variable throttle valve 22 and the air conduit 16.

In operation, during light load operation of the engine, the operating vacuum pressure generated at the second vacuum outlet 45 in the intake passage 11 is high and acts on the vacuum responsive actuator 25 to close the variable throttle valve 22 and acts on the vacuum responsive actuators 23 and 24 to open the exhaust gas recirculation control valve 15 and the air control valve 18. Exhaust gases from the exhaust passage 12 are then circulated back to the intake passage 11. The vacuum intensity in the air conduit 16 between the air control valve 18 and the orifice 19 acts through the orifice 38 on the regulating valve 27 to cause the central portion 29 of the diaphragm 28 to lift away from the valve port 32. Also the vacuum intensity in the first vacuum outlet 38 introduced into the second chamber 34 through the tube 35 acts on the regulating valve 27 to cause the diaphragm 28 to close the valve port 32. Thus, the action of the regulating valve 27 is regulated by means of both vacuum intensities in the air conduit 16 between the air control valve 18 and the orifice 19 and in the first vacuum outlet 44 in the venturi portion 36. As the vacuum intensity at the first vacuum outlet 44 increases, the regulating valve 27 closes and acts to raise the vacuum pressure in the vacuum responsive actuators 23 and 24, with the result that the rate of flow of exhaust gas circulation also increases.

On the other hand, in accordance with changes of operation of the engine from a light load to heavy load, the operating vacuum pressure generated at the second vacuum outlet 45 in the intake passage 11 begins to be reduced and cause the variable throttling valve 22 to open gradually. Thus the vacuum intensity in the chamber 33 is influenced in proportion thereto by the atmospheric pressure to move the central portion 29 of the diaphragm member 28 in a direction to reduce the leak rate through the opening 32. The vacuum intensity acting on the vacuum responsive actuator 23 then moves the exhaust gas recirculation control valve 15 to increase further the exhaust gas recirculation rate through the passageway 14.

From the foregoing description, it will be understood that the operating vacuum pressure from the intake passage acting on the control valves is regulated by a regulating valve placed in a passageway connecting the intake passage to atmosphere. The regulating valve responds in proportion to the engine load and is operated to vary or correct the exhaust gas recirculation rate in accordance with vacuum intensity in the intake passage so as to meet the operating condition of the engine. The exhaust gas recirculation control valve and the air control valve operate synchronously with each other as that by measuring the rate of flow through the orifice leading to atmosphere and selecting the flow characteristics of the exhaust gas recirculation control valve on the basis thereof, various rates of exhaust gas recirculation introduced into the engine can be established.

Figure 2:
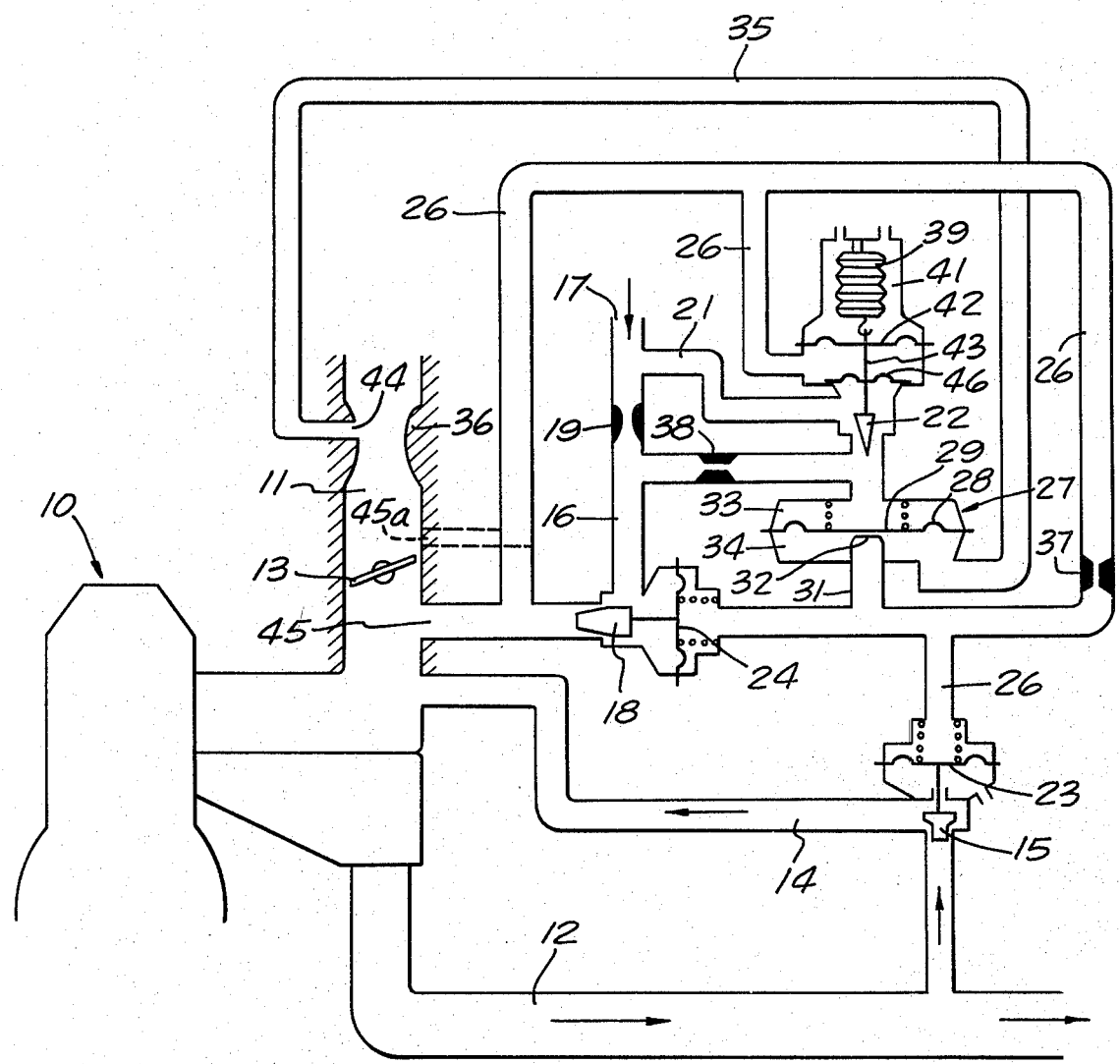
FIG. 2 is a view similar to FIG. 1 showing a modification.

The vacuum responsive actuator 25 responds to differential pressure between the atmospheric pressure acting over one side and the vacuum pressure in the control pipe system 26 acting on the other side. If such arrangement requires atmospheric pressure correction, it may be attained by the system shown in FIG. 2 of the drawings. The sealed flexible bellows 39 is mounted in a chamber 41 containing air at atmospheric pressure. A flexible diaphragm 42 encloses the bottom of the chamber 41 and is subjected to vacuum pressure in the control pipe system 26. The bellows 39, diaphragm 42, and diaphragm 46 are each operatively connected to the variable throttling valve 22 by means of the linkage 43. In other respects the construction and operation of the device of FIG. 2 is the same as that described above in connection with the device of FIG. 1.

Having fully described our invention, it is to be understood that we are not to be limited to the details herein set forth but that our invention is of the full scope of the appended claims.

We claim:

1. In an internal combustion engine having an intake passage for delivering an air-fuel mixture into the engine, a throttle valve in the intake passage, and an exhaust passage for carrying exhaust gases from the engine, the improvement comprising, in combination: a passageway connecting the exhaust passage to the intake passage downstream from the throttle valve for recirculating exhaust gases into said engine, an exhaust gas recirculation control valve in said passageway, an air conduit connecting said intake passage downstream from said throttle valve to atmosphere, an air control valve in said air conduit, said air conduit having a restriction located between its opening to atmosphere and said air control valve, a bypass conduit connected to said air conduit upstream and downstream with respect to said restriction, a variable throttling valve in said bypass conduit, each of said three valves having a vacuum responsive actuator, a regulating valve responsive to differential pressure between vacuum pressure in said intake passage upstream from said throttle valve and vacuum pressure in said bypass conduit downstream from said variable throttling valve, said regulating valve acting to control vacuum intensity in the actuators for said exhaust gas recirculation control valve, and said air control valve whereby exhaust gases are recirculated to the engine at a rate substantially in proportion to the rate of intake air to the engine.

2. The combination set forth in claim 1 in which said regulating valve has a chamber communicating with each vacuum responsive actuator of the exhaust gas recirculation valve and the air control valve through a piping system, said regulating valve acting to vent said piping system into said chamber on reduction of vacuum intensity in said intake passage upstream from said throttle valve.

3. The combination set forth in claim 1 including means whereby the vacuum responsive actuator for said variable throttling valve employs a single flexible diaphragm subjected on one side to air at atmospheric pressure, and on the other side to vacuum intensity in the intake passage downstream from said throttle valve.

4. The combination set forth in claim 1 including a hollow sealed flexible bellows surrounded by air at atmospheric pressure and operatively connected to said variable throttling valve.

5. In an internal combustion engine having an intake passage for delivering an air-fuel mixture into the engine, a throttle valve in the intake passage, and an exhaust passage for carrying exhaust gases from the engine, the improvement comprising, in combination: a passageway connecting the exhaust passage to the intake passage downstream from the throttle valve for recirculating exhaust gases into said engine, an exhaust gas recirculation control valve in said passageway, an air conduit connected to said intake passage at a location downstream from said throttle valve and extending to atmosphere, an air control valve in said air conduit, said air conduit having a restriction located between its opening to atmosphere and said air control valve, a bypass conduit connected to said air conduit upstream and downstream with respect to said restriction, a variable throttling valve in said bypass conduit, each of said three valves having a vacuum responsive actuator, each actuator being connected to a control pipe system which is in turn connected to said intake passage downstream from the throttle valve, a regulating valve responsive to differential pressure between vacuum pressure in a vacuum line connected to said intake passage upstream from said throttle valve, and atmospheric pressure in said bypass passage downstream from said variable throttling valve, said regulating valve having a variable opening for bleeding said control pipe system into said vacuum line for controlling vacuum intensity in the actuator for each of said control valves, whereby exhaust gases are recirculated to the engine substantially in proportion to intake flow of air to the engine.

6. The combination set forth in claim 5 including means whereby the vacuum responsive actuator for said variable throttling valve employs a single flexible diaphragm subjected on one side to air at atmospheric pressure, and on the other side to vacuum pressure in said control pipe system.

7. The combination set forth in claim 5 including a hollow sealed flexible bellows surrounded by air at atmospheric pressure and operatively connected to said variable throttling valve.

* * * * *